United States Patent [19]
Garrett et al.

[11] Patent Number: 4,749,066
[45] Date of Patent: Jun. 7, 1988

[54] DISC BRAKE FRICTION PAD BOLT LOCKING METHOD

[75] Inventors: Wayne H. Garrett, Troy; John A. Urban, Livonia, both of Mich.

[73] Assignee: Eaton Corporation, Cleveland, Ohio

[21] Appl. No.: 448,097

[22] Filed: Dec. 9, 1982

Related U.S. Application Data

[63] Continuation of Ser. No. 219,694, Dec. 24, 1980, abandoned.

[51] Int. Cl.⁴ ............................................. F16D 65/02
[52] U.S. Cl. ................................. 188/73.32; 403/353; 411/539
[58] Field of Search ............... 188/73.32, 73.33, 73.34, 188/73.43, 73.44, 73.45, 73.46, 73.47; 411/539; 403/337, 353

[56] References Cited

U.S. PATENT DOCUMENTS

| | | | |
|---|---|---|---|
| 1,520,028 | 12/1924 | Krause | 403/337 X |
| 2,796,748 | 6/1957 | Sheppard | 403/337 X |
| 2,929,645 | 3/1960 | Meckenstock | 403/337 X |
| 3,384,203 | 5/1968 | Walther et al. | 188/73.32 |
| 3,500,966 | 3/1970 | Birge | 188/72.4 |
| 3,548,973 | 12/1970 | Laverdant | 188/72.5 |
| 3,580,362 | 5/1971 | Falk | 188/73.33 X |
| 3,621,946 | 11/1971 | Mori | 188/73.32 |
| 3,841,444 | 10/1974 | Baum et al. | 188/73.38 X |
| 3,865,215 | 2/1975 | Burgdorf et al. | 188/73.33 |
| 3,899,052 | 8/1975 | Burnett et al. | 188/73.32 |
| 3,905,455 | 9/1975 | Martins | 188/73.43 |
| 3,939,945 | 2/1976 | Habgood | 188/73.47 |
| 4,027,749 | 6/1977 | Yamamoto et al. | 188/73.31 |
| 4,072,217 | 2/1978 | Inoue et al. | 188/73.34 |
| 4,084,666 | 4/1978 | Karasudani | 188/73.45 |
| 4,086,986 | 5/1978 | Haraikawa | 188/73.45 |

Primary Examiner—George E. A. Halvosa
Attorney, Agent, or Firm—P. S. Rulon

[57] ABSTRACT

A caliper assembly for a sliding caliper disc brake of the open back type wherein the brake pad assemblies are positioned on opposite sides of the brake disc by a pair of washerhead bolts which pass at their free ends through bores in one side wall of the caliper for threaded engagement with nuts and which pass adjacent their head ends through radially outwardly opening slots in the other side wall of the caliper with the washerhead portions of the bolts received in counterbores which are formed in the outer face of the other caliper side wall and which communicate with the slots in that side wall. With the described slot/counterbore construction, the bolts may be moved axially by an amount to withdraw their free ends from the bores in the one side and withdraw their washerheads from the counterbores, whereupon the portions of the bolts adjacent the bolt heads may be moved radially outwardly through the slots in the other side wall while the remainder of the bolts, together with the brake pad assemblies carried thereby, may be moved radially outwardly through the open back of the caliper.

11 Claims, 1 Drawing Sheet

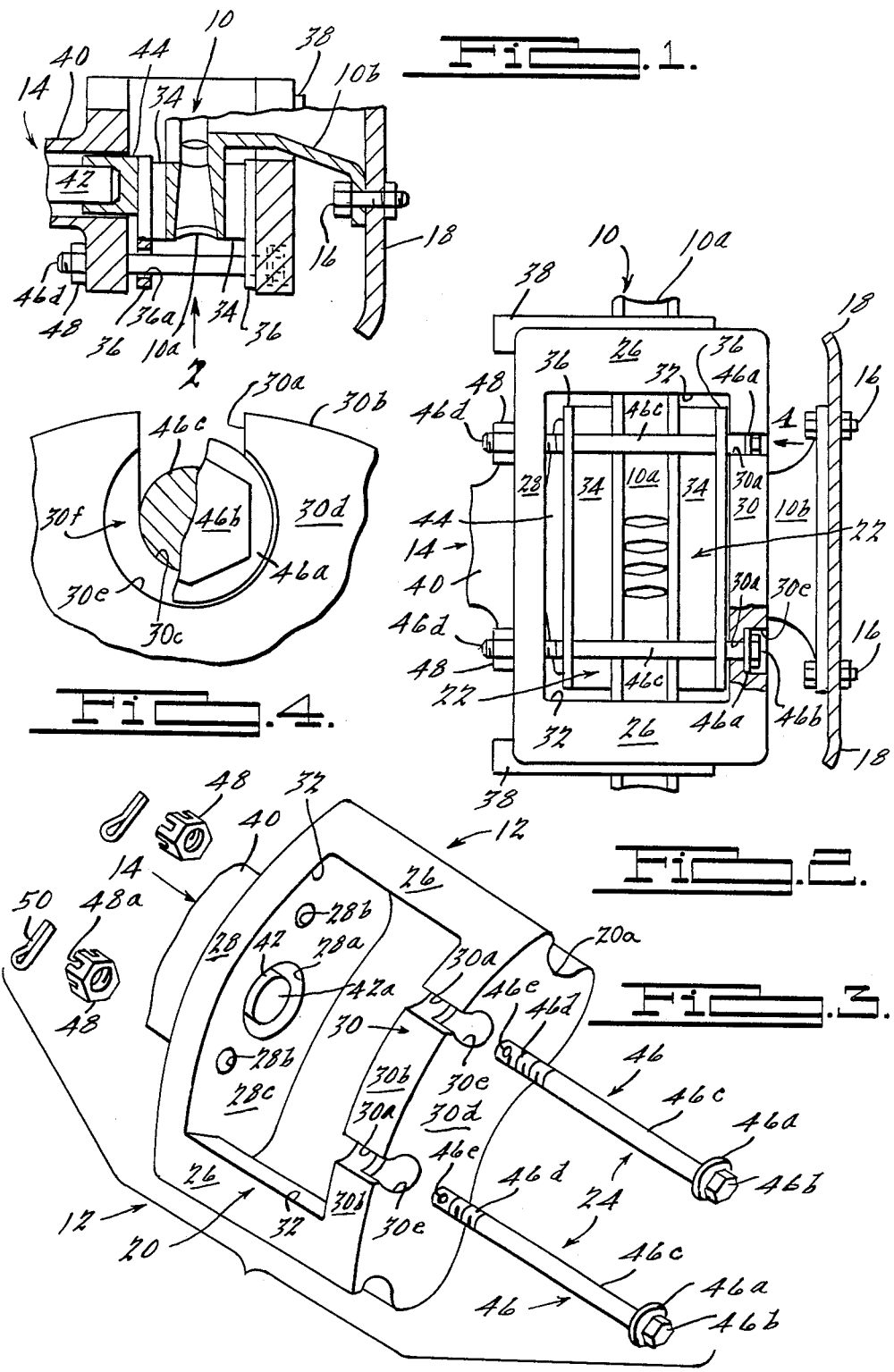

DISC BRAKE FRICTION PAD BOLT LOCKING METHOD

This is a continuation of application Ser. No. 219,694, filed Dec. 24, 1980, now abandoned.

BACKGROUND OF THE INVENTION

This invention relates to vehicular disc brakes of the sliding caliper type and, more particularly, to a caliper assembly for a sliding caliper disc brake.

In the typical sliding caliper disc brake, the caliper embraces the disc and is slidably supported at its opposite ends by a torque plate fixedly secured to a nonrotating portion of the axle assembly of the associated vehicle. As the brake is applied by the actuator assembly, the inboard brake pad is pressed against the inboard face of the disc, whereafter, with continued driving input from the actuator assembly, the caliper slides inboard on the torque plate to bring the outboard pad into frictional engagement with the outboard face of the disc.

It is important, particularly in heavy-duty truck fleet service, to be able to quickly remove and replace the brake pad assemblies. It is particularly desirable in fleet applications to be able to remove and replace the brake pad assemblies without removing the caliper or the associated wheel hub of the vehicle. In an effort to allow such ready removal, so-called "open back" caliper designs have been developed wherein an opening or window is provided in the back wall of the caliper through which the pad assemblies may be withdrawn directly. Such designs however require bolts or pins to position the pad assembly within the window in the caliper and require that the bolts or pins be totally axially withdrawn before the pad assemblies can be removed. In many heavy-duty truck applications, adjacent equipment, such as the associated wheel structure, severely encroaches on the space available around the brake and precludes complete axial withdrawal of the bolts or pins.

SUMMARY THE INVENTION

It is an object of the present invention to provide an improved disc brake caliper assembly wherein the brake assemblies may be readily removed and replaced.

A more specific object is to provide such an assembly wherein, despite the severe encroachment of adjacent vehicular equipment, the brake pad assemblies may be removed and replaced without removal of such encroaching equipment.

The invention caliper assembly is of the type wherein an elongated fastener member positions the brake pad assemblies between spaced sidewalls of the caliper on opposite sides of the disc and wherein the arcuate back wall of the caliper has an opening therein of sufficient size to allow the brake pad assemblies to pass radially outwardly through the opening for removal and replacement. According to an important feature of the invention, means are provided on the spaced sidewalls of the caliper which normally preclude radial movement of the fastener member relative to the caliper member but which are operative in response to limited axial movement of the fastener member to allow the fastener member to be moved, in assembly with the brake pad assemblies supported thereby, radially outwardly relative to the caliper member with the brake pad assemblies moving radially outwardly through the opening in the back wall of the caliper member.

In the disclosed embodiment of the invention, the fastener member comprises a washerhead bolt and the means on the spaced sidewalls of the caliper receiving the bolt comprise a throughbore in one sidewall passing the threaded free end of the bolt, a slot in the other sidewall opening at the radially outer circumferential edge of that sidewall and receiving another portion of the bolt, and a counterbore in the outer face of that sidewall receiving the washerhead portion of the bolt. With this arrangement, the pad assemblies may be removed for replacement simply by moving the bolt axially through a distance sufficient to allow the free end of the bolt to be withdrawn from the throughbore in the one sidewall and allow the washerhead portion to be withdrawn from the counterbore in the other sidewall, whereupon the bolt and brake pad assembly may be moved radially outwardly with the bolt shaft portion adjacent the head passing radially outwardly through the slot in the other sidewall and the remainder of the bolt, together with the pad assemblies carried thereby passing radially outwardly through the opening in the back wall of the caliper.

These and other features and advantages of the invention will become apparent from the following detailed description of a preferred embodiment of the invention and from the accompanying drawings.

BRIEF DESCRIPTION OF THE DRAWINGS

FIG. 1 is a somewhat schematic partially fragmentary view of the vehicular disc brake assembly embodying the invention caliper assembly;

FIG. 2 is a view looking in the direction of the arrow 2 in FIG. 1;

FIG. 3 is a perspective exploded view of the invention caliper assembly; and

FIG. 4 is a fragmentary view of a portion of the invention caliper assembly looking in the direction of the arrow 4 in FIG. 2.

DESCRIPTION OF THE PREFERRED EMBODIMENT

The disc brake assembly of FIG. 1 includes a disc 10, a caliper assembly 12, and an actuator assembly 14.

Disc 10 includes a brake ring portion 10a and a flange portion 10b secured as by bolts 16 to a wheel 18 of an associated vehicle.

Caliper assembly 12 includes a caliper 20, a pair of brake pad assemblies 22, and a pair of fastener assemblies 24. Caliper 20 is preferably formed as a unitary ferrous casting. Caliper 20, in transverse cross section, has a C-shaped configuration and circumferentially embraces an arcuate portion of ring portion 10a of disc 10. Caliper 20 includes an arcuate central (or back) wall portion 26 lying on an arc centered on the central axis of disc 10 and inboard and outboard sidewall or web portions 28 and 30. Outboard sidewall portion 30 has a smaller inner radial dimension than inboard sidewall portion 28 to facilitate clearance of disc 10 (FIG. 1). Caliper 20 is of the "open back" type. That is, the "back" wall portion 26 of the caliper is "open" as at 32.

Each brake pad assembly includes a brake pad 34 suitably bonded to a backing plate 36. Pad assemblies 22 are positioned between the sidewalls of the caliper on opposite sides of brake ring 10a by fastener assemblies 24. Each backing plate 36 includes holes 36a slidably passing fastener assemblies 24 so that brake pad assemblies 22 are mounted for sliding movement between the caliper sidewall on fastener assemblies 24. Opening 32 is of sufficient circumferential and axial extent to allow the brake pad assemblies to pass radially outwardly therethrough.

The ends of caliper 20 define grooves 20a which slidably receive guide pins 38 carried by a fixed portion of the associated vehicle, for example, a torque plate (not shown) secured to the vehicle axle assembly. Further details of the manner in which caliper 20 is slidably mounted on pins 38 are disclosed in application Ser. No. 169,546 filed July 17, 1980 and now abandoned in favor of continuation application Ser. No. 450,168 filed Dec. 16, 1982, U.S. Pat. No. 4,461,372, which is also assigned to the Assignee of this application.

Actuator assembly 12 is seen only fragmentarily and includes a tubular housing 40 formed, in the disclosed embodiment, integral with caliper sidewall portion 28 and a tappet 42 slidably positioned in housing 40 and driven, for example, by an air motor (not shown). The free end 42a of tappet 42 extends through an opening 28a in caliper side wall portion 28 and is received in a bridge bar 44 which acts against inboard backing plate 36 to press inboard pad 34 against the inboard face of brake ring 10a and thereafter slide the caliper inboard, or to the left as viewed in FIG. 1, to in turn apply outboard pad 34 against the outboard face of brake ring 10a, whereby to brake wheel 18 of the associated vehicle.

The present invention relates particularly to fastener assemblies 24 and, more particularly, to the manner in which fastener assemblies 24 coact with caliper 20 and brake pad assemblies 22 to facilitate removal and replacement of the pad assemblies.

Each fastener assembly 24 includes a washerhead bolt 46, a nut 48, and a cotter pin 50. Each bolt 46 includes a washerhead portion 46a (seen partially broken away in FIG. 4), a bolt head portion 46b, a shaft portion 46c, a threaded end portion 46d, and a through cross bore 46e in threaded portion 46b. Each nut 48 is castellated to define a series of grooves 48a. Cotter pins 50 are of known form.

Inboard sidewall portion 28 of caliper 20 defines two throughbores 28b each having a diameter slightly greater than that of bolts 46 to slideably pass the threaded bolt end portions 46d.

Outboard sidewall portion 30 of caliper 20 includes two slots 30a opening at the radially outer circumferential edge 30b of that sidewall and having a width slightly greater than the diameter of bolt shaft portions 46c. The bottom 30c of each slot is formed concentric with, and with the same radius as, bores 28b. The outer face 30d of caliper sidewall portion 30 is counterbored on the axis of each bore 28b to form counterbores 30e and arcuate shoulders 30f. The diameter of counterbores 30e is slightly greater than that of washerhead bolt portions 46a.

In assembled relation, threaded end portions 46d of bolts 46 pass through inboard caliper sidewall portion 28 for threaded engagement with nuts 48; cotter pins 50 pass through grooves 48a in nut 48 and through cross bores 46e to lock nuts 48 on bolts 46; bolt shaft portions 46c pass slidably through backing plate holes 36a to position pad assemblies 22 within caliper opening 32 on opposite sides of brake ring 10a; and bolt washerhead portions 46a are received in counterbores 30e with the inboard faces of the washerheads seated against arcuate shoulders 30f. Thus assembled, bolts 46 mount the brake pad assemblies for sliding brake apply and release movement; the bolts are precluded from axial movement by nuts 48 and washerhead portion 46a; and the bolts are precluded from radial movement by bores 28b and by the entrapment of washerhead portions 46a in counterbores 30e.

To change the brake pad assemblies, cotter pins 50 are pulled, nuts 48 unscrewed, and bolts 46 withdrawn axially to an extent to allow the free ends of threaded bolt portions 46d to clear the inner face 28c of inboard caliper sidewall 28 and allow washerhead portions 46a to clear the outer face 30d at outboard caliper sidewall 30, whereupon bolts 46 may be moved, in assembly with the brake pad assemblies, radially outwardly relative to the caliper with the bolt shaft portions adjacent the bolt heads passing radially outwardly through slots 30a and the remainder of the bolts, together with the brake pad assemblies carried thereby, moving radially outwardly through opening 32 in the caliper. The described arrangement allows the pad assemblies to be removed with limited axial movement of bolts 46. Specifically, complete withdrawl of the fastener bolt, as in prior art designs, would require movement through an axial distance at least as great as the distance between the confronting inner faces of the sidewalls whereas, in the invention design, bolts 46 need only be moved an axial distance sufficient to enable the free ends of the bolts to clear the inner face of the inboard sidewall and this limited amount of axial movement is possible even in situations, as shown, where the wheel of the associated vehicle encroaches on the space around the caliper and severely limits the axial distance that the bolts can be withdrawn. The described arrangement thus provides a ready means of removing and replacing the brake pad assemblies even in environments where complete axial withdrawal of the mounting bolts is precluded by the encroachment of adjacent vehicular structures.

Whereas a preferred embodiment of the invention has been illustrated and described in detail, it will be apparent that various changes and modifications may be made in the preferred embodiment without departing from the scope or spirit of the invention.

What is claimed is:

1. A disc brake caliper assembly adapted for use with a brake disc secured to a wheel of an associated vehicle, said caliper assembly including:

A. a pair of brake pad assemblies;
   B. a caliper member having axially spaced sidewalls adapted to be positioned on opposite sides of the brake disc and a backwall adapted to circumferentially encircle the periphery of the brake disc and having an opening therein between the ends of the caliper member of sufficient circumferential and axial extent to allow the brake pad assemblies to pass radially outwardly therethrough;
   C. at least one elongated fastener member adapted to slidably engage the brake pad assemblies and, position them between the sidewalls of the caliper member on opposite sides of the brake disc, and provide structural support for the sidewalls; and
   D. means on said spaced sidewalls receiving axially spaced portions of said fastener member and normally operative to preclude radial movement of said fastener member relative to said caliper member but operative in response to limited axial movement of said fastener member relative to said caliper member and while said fastener member remains slidably engaged with said brake pad assemblies to allow said fastener member to be moved, in assembly with the brake pad assemblies moving radially outwardly through the opening in the back wall of the caliper member.

2. A disc brake caliper assembly according to claim 1 wherein:
C. there are two elongated fastener members;
D. each fastener member comprises a washerhead bolt;
E. said means on said spaced sidewalls include, for each bolt,
  (1) a bore in one sidewall receiving one portion of the associated bolt,
  (2) a slot in the other sidewall receiving another portion of that bolt and opening at the radially outer circumferential edge of that sidewall, and
  (3) a counterbore in the outer face of said other sidewall receiving the washerhead portion of that bolt;
F. said limited axial movement comprises movement in a direction from said one sidewall toward said other sidewall and through a distance sufficient to withdraw said one portion of each bolt from the associated bore in said one sidewall; and
G. the portions of said bolts adjacent the boltheads move radially outwardly through said slot as the remainder of said bolts, together with the brake pad assemblies carried thereby, move radially outwardly through the opening in the back wall of the caliper member.

3. A disc brake caliper assembly according to claim 2 wherein
H. each said bore in said one sidewall is a through-bore passing said one portion of the associated bolt;
I. each said one portion has a threaded section extending beyond the outer face of said one sidewall; and
J. a nut threadably engages the threaded section of each bolt and cooperates with the shoulder of the counterbore in the outer face of the other sidewall to preclude axial movement of that bolt.

4. A disc brake caliper assembly according to claim 3 wherein said one sidewall is the inboard sidewall of said caliper member so that said limited axial movement is in an outboard direction and through a distance sufficient to withdraw the bolts from the bores in the inboard sidewall.

5. In a disk brake caliper assembly of the type including a pair of brake pad assemblies; a caliper member having axially spaced side walls adapted to be positioned on opposite sides of a brake disk secured to a wheel of an associated vehicle and a back wall adapted to circumferentially encircle the periphery of the brake disc and having an opening therein between the ends of the caliper member of sufficient circumferential and axial extent to allow the brake pad assemblies to pass radially outwardly therethrough; and means for releasably positioning the brake pad assemblies between the side walls of the caliper member on opposite sides of the brake disk: the improvement wherein said positioning means comprises
(a) at least one axially disposed bolt adapted to pass slidably through and support the brake pad assemblies;
(b) a bore in one side wall of said caliper member receiving one end of said bolt;
(c) a generally radially extending slot in the other side wall of said caliper member receiving the other end of said bolt and opening at the radially outer circumferential edge of that side wall;
(d) coacting interengaging means on said other side wall, adjacent said slot, and on said bolt, adjacent said other end thereof, operative to preclude radial movement of said bolt relative to said caliper member and provide structural support for said sidewalls but operative to disengage in response to axial movement of said bolt through a distance sufficient only to withdraw said one bolt end from said bore to release said bolt and allow said bolt to be moved in assembly with the brake pad assemblies supported thereby radially outwardly through said slot with said brake pad assemblies moving radially outwardly through the opening in the back wall of the caliper member.

6. A disc brake caliper assembly adapted for use with a brake disc secured to a wheel of an associated vehicle, said caliper assembly including:
a pair of brake pad assemblies;
a caliper member having axially spaced sidewalls adapted to be positioned on opposite sides of the brake disc and a back wall adapted to circumferentially encircle the periphery of the brake disc and having an opening therein between the ends of the caliper member of sufficient circumferential and axial extent to allow the brake pad assemblies to pass radially outwardly therethrough;
a bore in one sidewall;
a slot in the other sidewall opening at the radially outer circumferential edge of said other sidewall;
a counterbore in the outer face of said other sidewall, said counterbore axially aligned with a portion of said slot and with said bore and having a diameter greater than the width of said slot;
fastener means having an elongated portion and a head portion, said elongated portion received at one end by said bore and at the other end by said slot and slidably engaging the brake pad assemblies between said ends to position the assemblies between the sidewalls of the caliper member on opposite sides of the brake disc, and said head portion received by said counterbore to preclude radial movement of said elongated portion and moved axially from said counterbore in response to axial movement of said fastener a distance sufficient only to remove said fastener means from said bore for facilitating removal of said fastener means and said brake pads together.

7. The caliper assembly according to claim 6, wherein said fastener means includes means disposed at said one end of said elongated portion to secure said fastener means against axial movement relative to the caliper assembly.

8. The caliper assembly according to claim 7, wherein said means to secure comprise threaded means.

9. The caliper assembly according to claim 8, wherein said elongated member provides structural support for the spaced sidewalls.

10. The caliper assembly according to claim 6, wherein said one and includes a threaded portion extending through said bore and received by a threaded member.

11. The caliper assembly according to claim 10, wherein elongated member provides structural support for the spaced sidewalls.

* * * * *